UNITED STATES PATENT OFFICE.

WILLIAM W. BUNNELL, OF THOMASVILLE, NEBRASKA.

COMPOUND FOR PRESERVING WOOD.

SPECIFICATION forming part of Letters Patent No. 238,341, dated March 1, 1881.

Application filed January 24, 1881. (Specimens.)

*To all whom it may concern:*

Be it known that I, WILLIAM W. BUNNELL, a citizen of the United States, residing at Thomasville, in the county of Webster and State of Nebraska, have invented certain new and useful Improvements in Compounds for Preserving Wood; and I do hereby declare the following to be a full, clear, and exact description of the invention, such as will enable others skilled in the art to which it appertains to make and use the same.

My invention relates to improvements in the class of compounds especially designed for the preservation of wood; and the invention consists in a compound composed of boiled linseed-oil, pulverized charcoal, and pulverized saltpeter, in about the proportions hereinafter named.

In preparing the compound I take boiled linseed-oil and mix enough pulverized charcoal with it to make it of the consistency of paint. I then add one ounce of pulverized saltpeter to each gallon of the mixture.

The above-described compound is prepared cold, and it is applied to wood in the same manner as ordinary paint, the saltpeter penetrating the wood, and thus preventing any decay that might take place in consequence of absorption of moisture caused by coating over the outer surface of the wood with the compound.

What I claim, and desire to secure by Letters Patent of the United States, is—

The herein-described compound for preserving wood, consisting of boiled linseed-oil, pulverized charcoal, and pulverized saltpeter, in about the proportions specified.

In testimony whereof I affix my signature in presence of two witnesses.

WILLIAM W. BUNNELL.

Witnesses:
 MELISSA FRANCIS,
 D. M. FRANCIS.